(12) United States Patent
O'Ryan et al.

(10) Patent No.: US 10,773,542 B2
(45) Date of Patent: Sep. 15, 2020

(54) METHOD FOR MANUFACTURING A DECORATIVE PANEL

(71) Applicants: Schott Gemtron Corp., Sweetwater, TN (US); SCHOTT AG, Mainz (DE)

(72) Inventors: Adam O'Ryan, Sweetwater, TN (US); Carsten Schwabe, Horbach (DE); Grant Mason, Barrie (CA)

(73) Assignees: Schott Gemtron Corp., Sweetwater, TN (US); Schott AG, Mainz (DE)

( * ) Notice: Subject to any disclaimer, the term of this patent is extended or adjusted under 35 U.S.C. 154(b) by 77 days.

(21) Appl. No.: 15/789,056

(22) Filed: Oct. 20, 2017

(65) Prior Publication Data

US 2018/0111874 A1    Apr. 26, 2018

Related U.S. Application Data

(60) Provisional application No. 62/411,215, filed on Oct. 21, 2016, provisional application No. 62/411,234, filed on Oct. 21, 2016.

(51) Int. Cl.
*C03B 27/00* (2006.01)
*C03C 17/00* (2006.01)
(Continued)

(52) U.S. Cl.
CPC ............ *B44F 5/00* (2013.01); *B41M 5/007* (2013.01); *B41M 5/0041* (2013.01); *C03B 27/00* (2013.01); *C03C 17/002* (2013.01); *C03C 17/007* (2013.01); *C03C 17/04* (2013.01); *C03C 17/32* (2013.01); *C03C 17/42* (2013.01); *F24C 15/06* (2013.01); *F24C 15/12* (2013.01); *H05K 5/0017* (2013.01); *C03B 33/04* (2013.01);
(Continued)

(58) Field of Classification Search
None
See application file for complete search history.

(56) References Cited

U.S. PATENT DOCUMENTS 5,322,538 A * 6/1994 Kondo .................. C03C 15/00
430/323
6,504,559 B1 1/2003 Newton
(Continued)

FOREIGN PATENT DOCUMENTS

CN          103304153          9/2013
DE          69026322           10/1996
(Continued)

*Primary Examiner* — Cynthia Szewczyk
(74) *Attorney, Agent, or Firm* — Ohlandt, Greeley, Ruggiero & Perle, L.L.P.

(57) ABSTRACT

The present disclosure relates to a method for manufacturing decorative panels made of flat glass for electronic household appliances, in particular household appliances that are fixed in position. The method comprises, in the specified order, at least the steps of providing a flat glass, producing a blank decorative panel by forming the provided flat glass with at least one of the steps of forming the outer contour of the decorative panel, edge treatment, or making at least one indentation on the operational front, the thermal tempering of the produced blank decorative panel, and applying at least one decorative print on the operational back of the thermally tempered blank decorative panel by means of a digital printing method.

24 Claims, 2 Drawing Sheets

(51) Int. Cl.
*B44F 5/00* (2006.01)
*B41M 5/00* (2006.01)
*C03C 17/32* (2006.01)
*F24C 15/06* (2006.01)
*F24C 15/12* (2006.01)
*H05K 5/00* (2006.01)
*C03C 17/04* (2006.01)
*C03C 17/42* (2006.01)
*C03C 17/36* (2006.01)
*C03B 33/04* (2006.01)

(52) U.S. Cl.
CPC ........ *C03C 17/36* (2013.01); *C03C 2217/479* (2013.01); *C03C 2217/72* (2013.01); *C03C 2218/119* (2013.01); *C03C 2218/31* (2013.01); *C03C 2218/36* (2013.01); *C03C 2218/365* (2013.01)

(56) References Cited

U.S. PATENT DOCUMENTS

| | | | |
|---|---|---|---|
| 10,434,818 B2 | 10/2019 | O'Ryan | |
| 2004/0038616 A1 | 2/2004 | Toyoda | |
| 2004/0234735 A1* | 11/2004 | Reynolds | B41M 5/0047 428/204 |
| 2005/0151125 A1 | 7/2005 | Erchak | |
| 2005/0152125 A1 | 7/2005 | Fukuda | |
| 2006/0150680 A1* | 7/2006 | Hill | B44C 1/1712 65/60.2 |
| 2006/0249245 A1* | 11/2006 | Balling | C03C 17/04 156/241 |
| 2006/0286395 A1 | 12/2006 | Goto | |
| 2007/0098964 A1* | 5/2007 | Yacovone | B32B 17/10 428/195.1 |
| 2007/0256455 A1* | 11/2007 | Berden | C03C 17/04 65/66 |
| 2009/0130395 A1* | 5/2009 | Lyon | C03C 17/008 428/195.1 |
| 2009/0239733 A1* | 9/2009 | Kwon | C03B 29/08 501/53 |
| 2011/0250405 A1* | 10/2011 | Sawatsky | C04B 41/4853 428/174 |
| 2011/0274891 A1 | 11/2011 | De Rossi | |
| 2012/0324955 A1* | 12/2012 | Lim | C03B 23/0302 65/60.1 |
| 2013/0164483 A1 | 6/2013 | Cites | |
| 2013/0258436 A1* | 10/2013 | Podbelski | B32B 17/10266 359/265 |
| 2015/0101849 A1* | 4/2015 | Bockmeyer | C03C 17/007 174/257 |
| 2015/0103123 A1* | 4/2015 | Chen | B41M 7/00 347/102 |
| 2015/0274585 A1* | 10/2015 | Rogers | C03C 21/002 361/679.26 |
| 2017/0001906 A1 | 1/2017 | Karagöz | |
| 2017/0305784 A1* | 10/2017 | Anselmann | C03C 17/007 |

FOREIGN PATENT DOCUMENTS

| | | |
|---|---|---|
| DE | 10340754 | 3/2005 |
| DE | 10353992 | 6/2005 |
| DE | 10355448 | 7/2005 |
| DE | 102005013884 | 9/2006 |
| DE | 102014205066 | 10/2015 |
| EP | 1364924 | 11/2003 |
| EP | 1645550 | 4/2006 |
| WO | 2005003048 | 1/2005 |
| WO | 2016008848 | 1/2016 |

\* cited by examiner

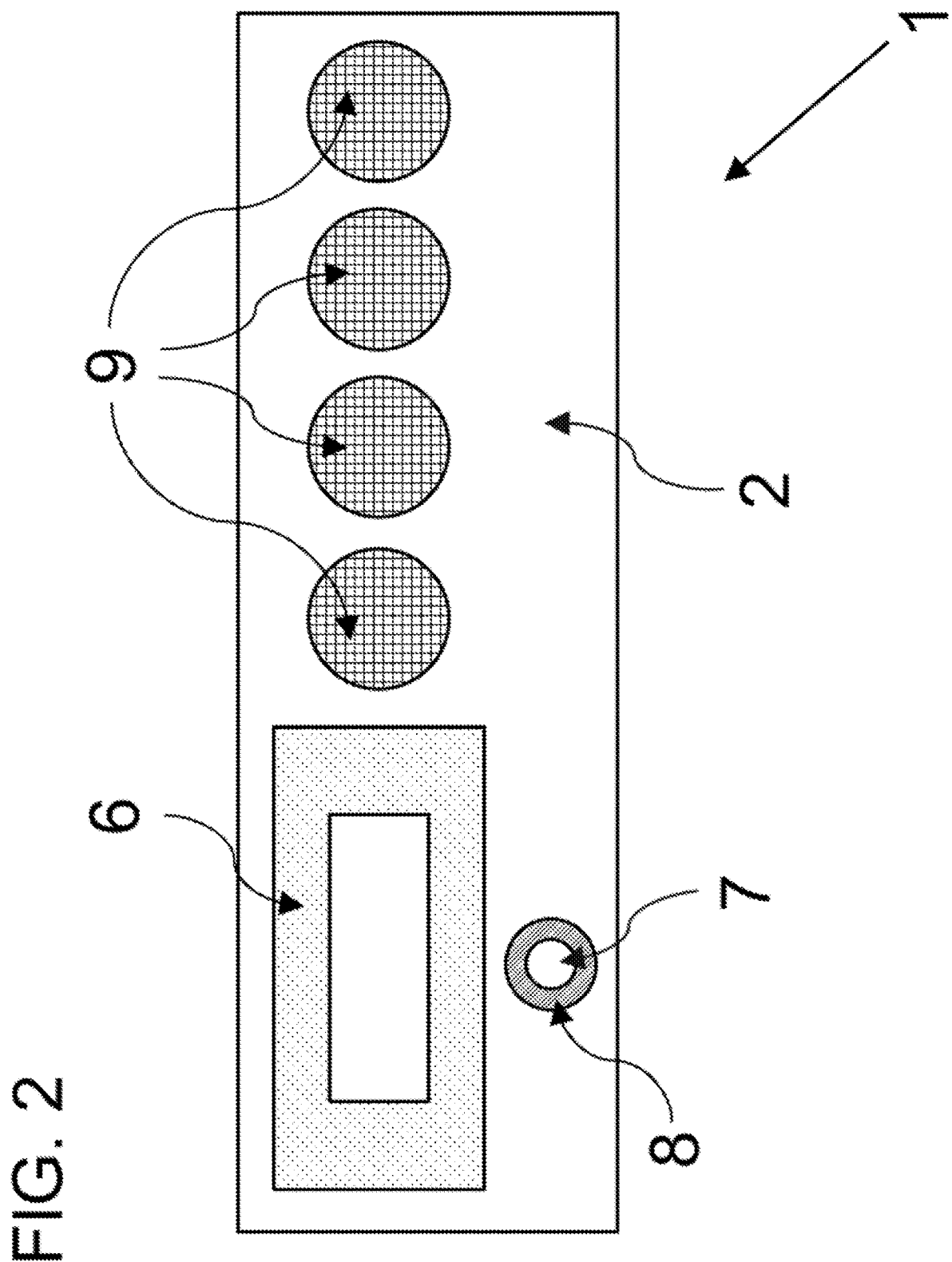

METHOD FOR MANUFACTURING A DECORATIVE PANEL

CROSS-REFERENCE TO RELATED APPLICATIONS

The present application claims the benefit of U.S. Provisional Patent Application Ser. No. 62/411,215, filed on Oct. 21, 2016, and U.S. Provisional Patent Application Ser. No. 62/411,234, filed on Oct. 21, 2016, each of which is herein incorporated by reference.

DESCRIPTION OF THE DISCLOSURE

1. Field of the Disclosure

The present disclosure relates to a method for manufacturing a decorative panel made of flat glass.

2. Description of the Related Art

A decorative panel is primarily a part of an outer casing of an item, which is intended to bring about both a desired aesthetic impression and a technical functionality of the item. Such technical functionalities include, for example, the protection of the encased item from detrimental external influences, the reflection or absorption of electromagnetic radiation, and an easier cleaning or operation of the item by the user. Many of these functionalities are made possible only by an appropriate coating or print. Decorative panels of the aforementioned type find use typically in the household sector, whether as a control panel or a front panel for a household appliance, such as a cooktop, a baking oven, a washing machine, etc., or whether as a panel of a piece of furniture. Especially in the case of household appliances, the requirements placed on the chemical, mechanical, and thermal durability of decorative panels are regarded as being very demanding, because high temperatures, high humidity up to hot steam, or exposure to other aggressive chemicals, such as cleaning agents or hot fat, for example, can occur in cyclic alternation during the operation thereof. Accordingly, the central requirement placed on any print of a decorative panel is its adhesion to the decorative panel under adverse conditions. Failure of adhesion is associated in every case with complete loss of the corresponding functionality. Appropriate test conditions can be taken from the applicable ISO standards, such as, for example, those relating to adhesion tests, resistance to liquids and humidity, influence of heat, evaluation of the degradation of coatings, or resistance to abrasion.

In addition, the design of these items in the household sector is subject to strong fashion trends as well as a prevailing tendency toward integration of an increasing number of different functionalities. This also influences the design of associated decorative panels as well as the manufacturing methods required for them.

Among functional prints, electrically conductive prints have assumed an especially important position. Conductive surface areas and lines that are applied to a decorative panel serve ever more often as integrated capacitive sensors for touch-sensitive switches. In the prior art, such prints have been applied onto decorative panels made of glass by means of screen printing using glass frit and large silver flakes of several micrometers in size, and are burned onto the surface during thermal tempering of the glass. On account of their relatively large layer thickness and the advantageous microstructure created during burning in, the enamel-like layers thereby produced have a low electrical resistance and, associated therewith, a high sensitivity for capacitive touch-sensitive switches.

At present, the market for decorative panels is characterized by a development toward smaller lot sizes with, at the same time, a greater diversity of product variants with a greater complexity of decorations and functionalities to be represented. As a result, the decorations, which have usually been expressed solely in black and white, are being increasingly expanded by colored elements, above all for lettering and symbols. Functionalities include, in addition to the touch-sensitive sensors that have already been named, elements that can be backlit, display capability, or coatings that protect against mechanical, chemical, or thermal stress.

In accordance with the prior art, such panels are manufactured by the application of a plurality of decorative and functional layers by the screen printing method. Thus, DE 10 2005 013 884 A1 describes a method for manufacturing a control panel for which, by means of screen printing, decorative and electrically conductive layers are applied onto a base body made of glass and subsequently burned in at temperatures of 600 to 700° C. For this purpose, both the colored and the conductive screen printing pastes contain glass frit, wherein inorganic particles, for example, such as those made of iron oxides, chromium oxides, or spinels are employed as color pigments, and silver particles are employed as conductive material. Enamel-like prints produced in this way exhibit, among other things, an outstanding adhesion to the glass as well as a very good resistance toward thermal and chemical stress.

However, in screen printing, a special mesh as well as a separate process step are needed for each color that is to be applied and for each functional material, respectively. In addition, thermal drying steps must be provided between the application of individual layers. The manufacture of complex decorative panels is thus not economically feasible in low volumes.

Against this background, the object of the present disclosure is to provide a method that satisfies the requirements presented above for manufacturing a decorative panel made of flat glass for electronic household appliances, in particular, large stationary household appliances, such as baking ovens, washing machines, or devices for heating systems.

SUMMARY OF THE DISCLOSURE

The present disclosure achieves this object with the features of the independent claim. Advantageous embodiments and enhancements of the disclosure are presented in the dependent claims.

Accordingly, in one embodiment, the present disclosure provides a method for manufacturing a decorative panel, which has an operational front and an operational back. The method comprises, in the specified order, at least the following steps: providing a flat glass; producing a blank decorative panel by performing least one of the following steps on the flat glass: forming the outer contour of the decorative panel, edge treatment, and making at least one indentation on the operational front; tempering the produced blank decorative panel thermally; and applying at least one decorative print on the operational back of the thermally tempered blank decorative panel with a digital printing method.

A decorative panel is understood in accordance with the disclosure to be a part of an outer casing of an item that creates both a desired aesthetic impression and a technical functionality.

The operational front of a decorative panel is understood here to be the outer side in the installed state. Correspondingly, the operational back is understood to be the inner side in the installed state. Accordingly, the operational front is exposed to external mechanical influences during its use. In contrast, the operational back faces away from such influences and hence is protected.

The term flat glass is understood to be glass in the form of a flat pane or panel, regardless of the method of production thereof. Such methods of production include, for example, flotation, rolling, drawing, and casting.

The term blank decorative panel is understood to be a formed glass, the form of which corresponds to that of the decorative panel due to the processing. In this intendment, a blank decorative panel is not necessarily a flat panel, because it can be processed by bending, flaring, or similar forming steps.

The term indentation is understood to mean both cylindrical or conical indentations, which are made by means of a drilling or engraving method, and those indentations made by means of grinding and polishing, such as, for example, spherical indentations or grooves. These drilled holes can be in the form of through openings passing through the entire depth of the glass or in the form of blind holes that have a depth that is less than the thickness of the glass. Indentations that are made by grinding and polishing generally have a depth that is less than the thickness of the glass.

The term decorative print is understood to mean a laterally structured coating that is produced by means of a printing method and, on account of its optical properties, in particular due to absorption, reflection, or scattering, is visible to the naked eye. In this sense, the term decorative print comprises, among other things, both aesthetic decorations and the representation of characters or symbols. A decorative print can also interact in a targeted manner with other technical means, such as a backlighting or a display device.

Digital printing methods are understood to mean those printing methods that can print electronically existing printing files without the use of a physical printing form, such as a screen or a plate, onto a printing substrate. Included here are, among other things, ink-jet printing, laser printing, and aerosol jet printing.

Prior to thermal tempering, it is necessary in accordance with the disclosure to form the provided flat glass in at least one process step in order to produce from it a blank decorative panel. The processes that come into consideration therefor include, for example, cutting the flat glass to size by means of laser cutting, water jet cutting, or mechanical cutting for forming the outer contour of the decorative panel. The edges at the outer contour of the decorative panel can be deburred by means of grinding and polishing, for example, and brought into a desired form, such as, for example, a C ground and polished edge. As a result of this, it is possible to prevent injuries from occurring at the cut edges of the glass and the installation thereof in a household appliance is simplified. Likewise, it is possible to make cylindrical or conical drilled holes by means of water jet methods or, for example, by means of diamond drilling or laser engraving methods. Furthermore, it is possible to make spherical indentations, grooves, or similar indentations on the operational front of the decorative panel by means of grinding and polishing. By means of suitable irradiation with lasers, bulges can be produced at the surface of the flat glass. Both the indentations and the bulges can serve, for example, for haptic interaction with a user of the decorative panel.

These forming process steps can be employed in accordance with the disclosure in different sequences and combinations either singly or multiple times. Other methods known to the person skilled in the art can also be employed. All of these process steps have in common the fact that they have to occur prior to thermal tempering of the blank decorative panel, because, after thermal tempering, they would destroy the blank.

The method step of thermal tempering according to the disclosure serves for designing the decorative panel as a single-pane safety glass and thereby increases the safety of the user during operation of the household appliance that contains the decorative panel. For this purpose, the blank decorative panel is heated to temperatures above the transformation temperature of the flat glass and then rapidly cooled. Due to the low thermal conductivity of the glass, the temperature at the surface of the glass drops more rapidly than in its core, as a result of which compressive stresses are created at the surface and tensile stresses arise in the core, thereby resulting in stabilizing the glass. In the event that the glass is destroyed by a mechanically imposed force, glass tempered in this way shatters into a large number of very small fragments, so that the danger of injury due to the fragments is markedly reduced in comparison to large shards.

Since no static printing forms are used in digital printing, the costs and time expenditure associated therewith for production, delivery, storage, and refurbishing are dispensed with. The elimination of printing forms further makes it possible to apply the colors used or the functional materials more efficiently, because material residues always remain on printing forms and must be disposed of after the printing operation.

The decorative print is applied by means of a digital printing method on the operational back of the decorative panel in order to protect it against mechanical and chemical influences, such as, for example, cleaning agents.

In a preferred enhancement of the disclosure, the flat glass used is a soda-lime glass, the thickness of which is preferably 2 mm to 8 mm, more preferably 3 mm to 6 mm. Soda-lime glass is understood to mean a glass that, as main constituent, has an oxide-based weight percent of 70-76 weight % $SiO_2$, 11-17 weight % $Na_2O$, and 8-16 weight % CaO and is characterized by a transformation temperature of less than 600° C. This is advantageous in terms of energy and thus also of economy above all for the thermal tempering process.

Glass thicknesses of less than 2 mm are not suitable for the thermal tempering in industrial production plants, because, for this purpose, extremely high rates of cooling are required and are difficult to achieve on a large industrial scale. Starting from glass thicknesses of at least 3 mm, soda-lime glasses can be thermally tempered with relatively little effort and in high yield. Glass thicknesses greater than 8 mm have a large installation depth and a heavy weight. In contrast to this, preferably glasses with thicknesses of at most 6 mm, which have a mass distribution of at most 15 kg/m$^2$, are used.

In another preferred enhancement, the flat glass used is a flat glass produced by the flotation method. Such a floated glass has an atmospheric side, which does not come into contact with the tin bath during the flotation method, and a tin side, which is in contact with the tin bath during the flotation method. The inventors have found that, when floated flat glass is used, printing on the atmospheric side of the flat glass exhibits an especially advantageous adhesion.

Preferably, therefore, when floated flat glass is used, the atmospheric side of the glass is disposed on the operational back of the decorative panel.

Furthermore, the inventors have surprisingly found that the adhesion of a print according to the disclosure on glass can be improved yet further when the printing takes place within a short time after the thermal tempering thereof. It is suspected that the thermal tempering brings about a surface activation at which the print is bonded. In a preferred enhancement of the disclosure, the application of the decorative print takes place accordingly less than 3 days, preferably less than 1 day, more preferably less than 3 hours, most preferably less than 1 hour after conclusion of the thermal tempering process. The conclusion of the thermal tempering is understood here to mean the point in time starting from which the glass has cooled, at least at its surface, to below 100° C.

When the method according to the disclosure or an enhancement thereof is used, it is unexpectedly found that the adhesion of the print on the blank decorative panel is so good that it is even possible to dispense with the use of an adhesion-promoting layer. In another preferred enhancement, therefore, prior to the application of the decorative print, no adhesion-promoting layer is applied to the blank decorative panel.

In another preferred enhancement, ink-jet printing is employed as the digital printing method. This makes it possible to apply decorative and functional prints with high precision and flexibility. Ink-jet printing is easy to scale through the use of appropriate printing heads, both in regard to the surface of the substrate and the printing speed as well as in regard to the number of colors and materials that can be applied in one process step. Thus, an ink-jet method can operate, for example, virtually continuously in the single-pass method, in which the printing head travels only one time across the surface to be printed, or in a batch-based manner in the multi-pass method, in which the printing head travels several times across the surface to be printed and, in the process, a plurality of colors or a plurality of layers are applied or a plurality of curing steps occur when UV sources are integrated into the printing head. In ink-jet printing, it is possible to print solutions and colloidal suspensions, that is, suspensions in which the solid particles are between 1 nm and 1 μm in size, as well as also fine suspensions, in which the solid particles are larger than 1 μm in size, as long as they have a sufficiently low viscosity. In practice, this means that the viscosity is generally between 1 mPa s and 500 mPa s. The viscosity can be adjusted in this case, for example, by means of the size of the dissolved or dispersed solids, the percent solids, or even the choice of the solvent or the dispersing agent. Examples of these classes of materials are organic dyes dissolved in a solvent (solution), pigments dispersed in a liquid (colloidal suspension), or fine suspensions containing glass frit.

Preferably, ink-jet printing is employed as a multi-color printing in this case. In this way, it is possible to apply various mixtures of colors including photo-realistic graphics with high color brilliance in a single process step. In CMYK four-color printing, which is based on the subtractive color mixture of cyan (C), magenta (M), yellow (Y), and black (key, K), however, it is not possible to represent all required chromaticity points. For this reason, in a preferred enhancement of the method, said printing is supplemented by white (W) for CMYKW five-color printing as well as optionally by additional special colors. Such special colors can serve, for example, to expand the color palette. For this, orange, green, bright cyan, or bright magenta are taken into consideration. Respectively suitable special colors can also be employed for creating specifically defined full-tint colors that cannot be reproduced exactly in the CMYKW color model.

In another preferred enhancement, the printing colors applied for the decorative print are cured by irradiation with light that comprises wavelengths of less than 450 nm. Employed for this purpose are preferably solutions or colloidal suspensions that contain constituents that can be polymerized or crosslinked, along with photo initiators. Preferably, light of this kind is supplied by at least one light-emitting diode (LED). However, it is also possible for this light to be supplied by other light sources, such as, for example, mercury vapor lamps or laser diodes.

Unexpectedly, it has hereby been shown that the procedure for curing has an additional strong influence on the adhesion of the print on the glass. If the print consists of a single layer, then a complete curing of the print by a single irradiation has proven optimal for the adhesion. If the print consists of a plurality of layers, then it has been shown that both the adhesion of the print on the glass and also the adhesion of the individual layers to one another could be markedly improved in that, during the curing, in a first step, each layer was initially only partially cured after the application thereof and the complete curing occurred by a further irradiation after the last layer was completed. In another preferred enhancement, therefore, the print is completely cured either by a single irradiation or, in a first step, is only partially cured by a first irradiation, so that additional layers can be printed and, in a last step, all layers of the print can then be finally cured by another irradiation.

In another preferred enhancement, after application of the print, at least one thermal post-treatment step occurs by means of a digital printing method. Surprisingly, it has been found that the adhesion of the print to the substrate is further improved in this way. This is surprising, in particular, for printing colors that are cured by irradiation with light. In the case of electrically conductive layers, the conductivity was additionally improved thereby. Such an advantageous post-treatment step takes place at temperatures of less than 500° C. As higher temperatures, the thermal tempering of the decorative panel can once again be diminished. Preferably, it should be carried out at temperatures of less than 350° C. In this temperature range, it is ensured that, in particular, the thermal tempering of the glass is not diminished and, for example, a digitally printed conductive layer can attain an adequate electrical conductivity. More preferably, the temperature should not exceed 150° C. for such a post-treatment. This has proven necessary above all when the print contains temperature-sensitive constituents, such as organic molecules.

In another preferred enhancement, an additional decorative print is applied using glass frit prior to the thermal tempering. Such a print can be applied by means of ink-jet printing, screen printing, or template printing on the front or back of the blank decorative panel. The following step of thermal tempering can then be utilized simultaneously for burning in the decorative print applied in this way on the surface of the blank decorative panel.

In another preferred enhancement, at least one effect layer, taken from the group of pearl luster, mirror, or metal effects, can be applied to the operational front or back of the blank decorative panel by means of screen printing or template printing, roller coating, spray coating, or sputtering. This step occurs preferably prior to the thermal tempering of the blank decorative panel.

For geometric reasons, it is not possible to print into indentations in a blank decorative panel by means of the methods known in the prior art for manufacturing a decorative panel, particularly by means of screen printing. In the case of flat glasses with bulges on the side of the glass to be printed, it is even possible above a certain height of the bulge to print only the bulges, but not the regions of the glass lying in between. Because digital printing methods such as ink-jet printing or aerosol jet printing operate without contact, that is, the printing head is not in contact with the flat glass, it is accordingly then possible also to print into indentations or onto spaces in between bulges. In another preferred enhancement of the disclosure, prior to the thermal tempering step, at least one decorative print is applied onto the surface of at least one indentation on the operational front of the blank decorative panel by means of ink-jet printing or pad printing using glass frit, with the decorative print applied in this way being burned onto the surface of the blank decorative panel during the thermal tempering process.

In another preferred enhancement of the disclosure, after the thermal tempering step, at least one decorative print is applied onto the surface of at least one indentation on the operational front of the blank decorative panel by means of a digital printing method.

In another preferred enhancement, in addition to the decorative print, another decorative print or functional layer is applied on the operational front of the thermally tempered blank decorative panel. The functional layer can involve, for example, an anti-glare layer, a scratch-resistant layer, or a layer that is easy to clean.

In another preferred enhancement, after application of the decorative print onto this layer, a protective coating is applied by means of digital printing, screen printing, roller application, spray coating, slot die coating, or a similar method. Protective coatings of this kind, for example, can reduce the thermal or chemical degradation of the print. They can be applied over the entire surface of the blank decorative panel or, for example, recesses for light sources or displays, which are mounted behind the decorative panel in a household appliance, can be provided.

In another preferred enhancement, the method according to the disclosure is supplemented by a step for application of an electrically conductive printing after application of at least one first layer of the decorative print. The inventors have hereby found that the silver pastes containing glass frit that are known from the prior art are not suitable for this purpose. In contrast, silver in the form of dispersed nanoparticles, that is, particles with a diameter of less than 1 μm, or in the form of dissolved silver complexes have been found to be suitable. Conductive structures produced from these materials require a thermal post-treatment in order to minimize the electrical resistance of the print. In this way, adequately low resistance values were attained at temperatures of less than 350° C. or of less than 150° C. Preferably, the inks for manufacturing electrically conductive prints accordingly contain no glass frit.

Under certain circumstances, it may be necessary, in spite of the possibilities already described, to improve the adhesion still further. This can be the case, for example, for applications with very demanding requirements placed on durability, or when, for other reasons, certain previously discussed method steps cannot be employed. This applies, in particular, when the application of the print cannot be conducted directly after thermal tempering of the flat glass. In another preferred enhancement, therefore, prior to the application of the decorative print, an adhesion-promoting layer is applied on the operational back of the blank decorative panel, preferably by means of a digital printing method. Such a layer can be applied either using inorganic materials prior to the thermal tempering or using organic materials after the thermal tempering.

In accordance with another preferred enhancement of the disclosure, the decorative panel involves a control panel or an external door glazing for electronic household appliances. Preferably, these household appliances involve electronic household appliances that are fixed in position, such as, for example, baking ovens, cooktops, refrigerators, coffee machines, microwave appliances, steamers, range hoods, dishwashers, washing machines, washer-driers, devices for heating systems, or devices combining several of these functions, such as, for example, baking ovens with microwave functions, or combined washer-driers that can both wash and dry laundry.

The disclosure will be described in detail since an exemplary embodiment of a decorative panel that is manufactured in accordance with the disclosure and is illustrated in the figures. As exemplary embodiment, a decorative control panel for a household appliance is chosen.

BRIEF DESCRIPTION OF THE FIGURES

FIG. 2 shows a plan view onto the operational front of a decorative control panel.

DETAILED DESCRIPTION OF THE DISCLOSURE

Figure 1:
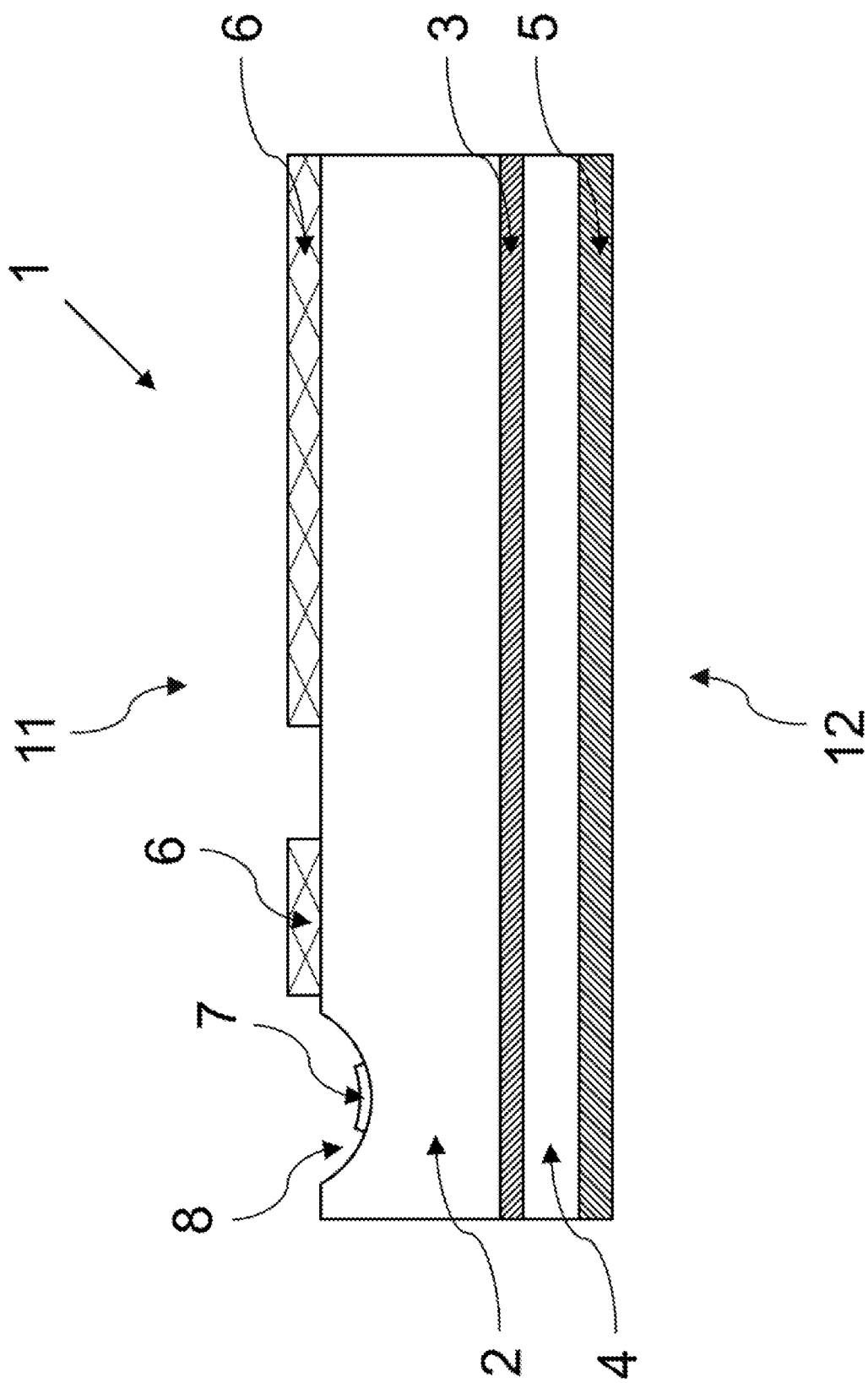
FIG. 1 shows, in a schematic illustration, a cross section of a decorative control panel.

FIGS. 1 and 2 show a decorative panel 1, which has an operational front 11 and an operational back 12 and is manufactured from a blank decorative panel 2. On the back 12, the illustrated decorative panel 1 has an adhesion-promoting layer 3, a decorative print 4 produced by means of a digital printing method, and a protective coating 5.

On the front 11, the decorative panel 1 comprises an indentation 8, a decorative print 7 printed into the indentation, and another decorative print or functional layer 6, which has a recess.

Furthermore, the decorative panel 1 in FIG. 2 has drilled holes 9 passing through the entire thickness of the glass in the form of through-openings.

The disclosure will be explained in detail below on the basis of further exemplary embodiments.

EXAMPLE 1

A glass pane or panel that is 4 mm thick and is made of floated soda-lime glass with a low iron content is provided. This glass panel is cut to size mechanically by means of scoring and breaking. For formation of the desired outer contour of the blank decorative panel as well as of a C cut of the edges, the cut glass panel is processed by grinding. In the next step, a spherical indentation with a diameter of 14 at the surface of 14 mm and a depth of 1 mm is made on the operational front of the blank decorative panel by means of grinding and polishing. In the process, the tin side of the glass is chosen as front. Subsequently, a cylindrical passage with a diameter of 50 mm is drilled in the blank with a diamond drill. After this method step of forming, the blank is cleaned in order to remove residues from the surfaces of the blank.

The blank thereby formed and cleaned is printed on its front with a two-color logo by means of screen printing using inorganic pigments and glass frit. This print is initially pre-dried in an oven. After drying of the print, the blank is thermally tempered in a tempering oven, wherein the two-color logo is burned onto the front. Prior to further processing of the blank decorative panel tempered in this way, it is cooled to a temperature of less than 100° C.

Directly afterwards, the tempered blank decorative panel is printed with a photo-realistic graphic on the operational back on an ink-jet printer. The printing color is hardened during the printing process on the blank decorative panel by means of UV LEDs integrated in the printing head. Optionally, the print is coated over the entire surface with a transparent protective coating using the same printer in order to protect it against mechanical damage. The protective coating is likewise hardened by means of UV LEDs.

Subsequently, the substrate is turned over and a single-color pictogram is printed into the spherical indentation on the operational front and this print is likewise hardened by means of UV LEDs.

EXAMPLE 2

The blank decorative panel is fabricated from soda-lime glass with a thickness of 3 mm by means of mechanical cutting, grinding, cleaning, and thermal tempering in analogy to Example 1.

Immediately after cooling to a temperature of less than 100° C., the tempered and cooled blank decorative panel is printed on the operational back, which corresponds to the atmospheric side of the soda-lime glass, by means of an ink-jet printer, with a single-color black print, which has a rectangular recess for a display device as well as additional recesses in the form of pictograms, which, in the installed state, for example as a control panel in a stove, can be backlit from the operational back with a lighting means. Optionally, electrically conductive structures made of silver with use of nanoparticle ink are applied around the recesses or at least on one side of the recesses by means of ink-jet printing. These silver structures are thermally dried in an oven and thereby attain a specific electrical resistance of less than 250 µOhm cm. They can be used, for example, as sensors for capacitive touch sensors.

EXAMPLE 3

The method of fabrication of Example 3 corresponds to that mentioned in Example 2, with a transparent adhesion-promoting print being applied prior to the application of the single-color black print by means of the same ink-jet printer.

The person skilled in the art will understand that the present disclosure is not limited to the solely exemplary embodiments described above on the basis of the figures, but can be varied in diverse ways within the scope of the subject matter of the patent claims. In particular, the features of individual exemplary embodiments can be combined with one another. In addition, it is possible in an advantageous way to allow individual process steps of the method according to the disclosure to proceed several times in succession or to add additional process steps prior to, in between, or after the steps required in accordance with the disclosure.

What is claimed is:

1. A method for manufacturing a decorative panel, which has an operational front and an operational back, which comprises, in the specified order, at least the following steps:
    providing a flat glass produced by a floatation method, wherein the flat glass comprises an atmospheric side and a tin side;
    producing a blank decorative panel by performing at least one of the following steps on the flat glass: forming the outer contour of the decorative panel, edge treatment, and making at least one indentation on the operational front;
    tempering the produced blank decorative panel thermally;
    applying at least one decorative print on the operational back of the thermally tempered blank decorative panel with a digital printing method, wherein the operational back of the thermally tempered blank decorative panel is the atmospheric side.

2. The method according to claim 1, wherein the flat glass is soda-lime glass.

3. The method according to claim 1, wherein the flat glass has a thickness of at least 2 mm to 8 mm.

4. The method according to claim 1, wherein the decorative print is applied less than 3 days after conclusion of the tempering step.

5. The method according to claim 1, wherein the decorative print is applied less than 1 hour after conclusion of the tempering step.

6. The method according to claim 1, wherein, prior to the application of the decorative print, no adhesion-promoting layer is applied onto the blank decorative panel.

7. The method according to claim 1, wherein the digital printing comprises ink-jet printing.

8. The method according to claim 7, wherein the ink jet printing is expressed as CMYKW five-color printing.

9. The method according to claim 8, wherein the CMYKW five-color printing is cured by irradiation with light that comprises wavelengths of less than 450 nm.

10. The method according to claim 1, further comprising, after the applying step, thermally post-treating step the blank decorative panel at a temperature of less than 500° C.

11. The method according to claim 1, further comprising the step of applying at least one additional decorative print on the operational front or back, prior to the thermal tempering of the blank decorative panel, with ink-jet printing, screen printing, or template printing using glass frit, wherein the at least one additional decorative print is burned onto the surface of the blank decorative panel during the thermal tempering process.

12. The method according to claim 1, further comprising the step of applying at least one effect layer elected from the group of pearl luster, mirror, or metal effects to the operational front or back with screen printing, template printing, roller coating, spray coating, or sputtering.

13. The method according to claim 1, further comprising the step of applying at least one decorative print is onto the surface of the at least one indentation on the operational front prior to the thermal tempering step, with ink-jet printing or pad printing using glass frit, wherein the decorative print is burned onto the surface of the blank decorative panel during the thermal tempering process.

14. The method according to claim 1, further comprising the step of applying at least one additional decorative print or functional layer onto the operational front of the thermally tempered blank decorative panel.

15. The method according to claim 1, further comprising the step of applying at least one decorative print in the at least one indentation on the operational front of the thermally tempered blank decorative panel with a digital printing method.

16. The method according to claim 1, further comprising the step of, after the applying of the print step, applying a protective coating on this print with digital printing, screen printing, roller application, spray coating, or slot die coating.

17. The method according to claim 1, further comprising the step of, after the applying of the decorative print step, applying an electrically conductive print.

18. The method according to claim 1, further comprising, prior to the applying of the print step, applying an adhesion-promoting layer onto the operational back.

19. The method according to claim 18, wherein the adhesion-promoting layer is applied with digital printing.

20. The method according to claim 1, wherein the decorative panel is a control panel or external door glazing for electronic household appliances.

21. A method for manufacturing a decorative panel, which has an operational front and an operational back, which comprises, in the specified order, at least the following steps:
providing a flat glass that is a soda-lime glass;
producing a blank decorative panel by performing at least one of the following steps on the flat glass: forming the outer contour of the decorative panel, edge treatment, and making at least one indentation on the operational front;
tempering the produced blank decorative panel thermally;
applying at least one decorative print on the operational back of the thermally tempered blank decorative panel with a digital printing method, wherein the at least one decorative print comprises organic dyes; and
curing the applied printing by irradiation, with light that comprises wavelengths of less than 450 nm.

22. A method for manufacturing a decorative panel, which has an operational front and an operational back, which comprises, in the specified order, at least the following steps:
providing a flat glass;
producing a blank decorative panel by performing at least one of the following steps on the flat glass: forming the outer contour of the decorative panel, edge treatment, and making at least one indentation on the operational front;
tempering the produced blank decorative panel thermally;
applying at least one decorative print on the operational back of the thermally tempered blank decorative panel with a digital printing method, wherein the digital printing comprises ink-jet printing.

23. A method for manufacturing a decorative panel, which has an operational front and an operational back, which comprises, in the specified order, at least the following steps:
providing a flat glass;
producing a blank decorative panel by performing at least one of the following steps on the flat glass: forming the outer contour of the decorative panel, forming the edge treatment, and making at least one indentation on the operational front;
tempering the produced blank decorative panel thermally;
applying an adhesion-promoting layer onto the operational back;
applying at least one decorative print on the operational back of the thermally tempered blank decorative panel with a digital printing method.

24. The method according to claim 23, wherein the adhesion-promoting layer is applied with digital printing.

* * * * *